US012748196B2

(12) United States Patent
Branca

(10) Patent No.: US 12,748,196 B2
(45) Date of Patent: Sep. 29, 2026

(54) LIGHT SENSOR

(71) Applicant: STMicroelectronics (Alps) SAS, Grenoble (FR)

(72) Inventor: Xavier Branca, Sassenage (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 907 days.

(21) Appl. No.: 18/093,210

(22) Filed: Jan. 4, 2023

(65) Prior Publication Data

US 2023/0221420 A1 Jul. 13, 2023

(30) Foreign Application Priority Data

Jan. 7, 2022 (FR) ........................................ 2200116

(51) Int. Cl.

*G01S 7/4865* (2020.01)
*G01J 1/02* (2006.01)
*G01J 1/44* (2006.01)
*H02M 3/155* (2006.01)

(52) U.S. Cl.

CPC ........... *G01S 7/4865* (2013.01); *G01J 1/0219* (2013.01); *G01J 1/44* (2013.01); *H02M 3/1552* (2021.05); *G01J 2001/442* (2013.01); *G01J 2001/4466* (2013.01)

(58) Field of Classification Search

CPC .... G01S 7/4865; G01S 17/894; G01S 7/4863; G01J 1/0219; G01J 1/44; G01J 2001/442; G01J 2001/4466; H02M 3/1552; H02M 3/156; H02M 1/0009; H02M 1/32; H02M 3/158

See application file for complete search history.

(56) References Cited

U.S. PATENT DOCUMENTS

2006/0202129 A1 9/2006 Niclass et al.
2014/0191115 A1* 7/2014 Webster ................ H10F 30/225 250/214 R
2016/0223397 A1* 8/2016 Tsai .......................... G01J 1/44
2018/0120152 A1 5/2018 Leonardo
2018/0308881 A1 10/2018 Hynecek
2020/0127565 A1 4/2020 Liang et al.
2021/0088634 A1 3/2021 Kimball et al.
2021/0156972 A1 5/2021 Droz et al.
2021/0193859 A1 6/2021 Al-Rawhani et al.

OTHER PUBLICATIONS

CN First Office Action and Search Report for counterpart CN Appl.. No. 202310018725.2, report dated Jul. 18, 2025, 8 pgs.
INPI Search Report and Written Opinion for priority application, FR 2200116, report dated Aug. 2, 2022, 14 pgs.
CN Second Office Action and Search Report for counterpart CN Appl.. No. 202310018725.2, report dated Dec. 4, 2025, 6 pgs.

* cited by examiner

*Primary Examiner* — Seung C Sohn
(74) *Attorney, Agent, or Firm* — Crowe & Dunlevy LLC

(57) ABSTRACT

A light sensor includes an integrated circuit chip and a boost DC/DC converter. The integrated circuit chip supports an array of pixels, each pixel including a SPAD. The boost DC/DC converter delivers to the SPADs a bias potential capable of placing the SPADs in Geiger mode. The boost DC/DC converter includes an inductive element, a first switch, a second switch, and a circuit for controlling on/off switching of the first switch. The inductive element and the first and second switches are arranged outside of the integrated circuit chip while the control circuit forms part of the integrated circuit chip.

16 Claims, 2 Drawing Sheets

LIGHT SENSOR

PRIORITY CLAIM

This application claims the priority benefit of French Application for Patent No. 2200116, filed on Jan. 7, 2022, the content of which is hereby incorporated by reference in its entirety to the maximum extent allowable by law.

TECHNICAL FIELD

The present disclosure generally concerns electronic circuits and, more particularly, light sensors such as, for example, time-of-flight sensors.

BACKGROUND

Light sensors comprising single-photon avalanche diodes (SPADs) are known. Such sensors, for example, time-of-flight sensors, comprise a pixel array where each pixel in the array comprises at least one SPAD and is, for example, referred to as a SPAD pixel or single-photon avalanche diode pixel. This pixel array is implemented inside and on top of an integrated circuit chip, the chip being implemented from a semiconductor layer. Other circuits of the sensor, for example, pixel driver circuits and/or pixel readout circuits, are generally implemented in the same integrated circuit chip as the pixel array.

As well known by those skilled in the art, to detect a single-photon, a SPAD must first be biased by a potential greater than its breakdown voltage. This bias potential is determined so that the electric field in the PN junction of the diode is high enough for, when a photon is received by the SPAD and causes the generation of a charge carrier, the injection of this charge carrier into the depletion area of the SPAD to trigger an avalanche phenomenon in the SPAD. This operating mode of a diode is referred to as the Geiger mode in literature.

There exist various solutions to generate this bias potential and to deliver it to the SPADs of the sensor pixel array. However, these known solutions all have disadvantages.

There is a need for a light sensor comprising an integrated circuit chip, the chip comprising an array of SPAD pixels, where the generation of the potential for biasing the SPADs above their breakdown voltage solves at least some of the disadvantages of known light sensors.

SUMMARY

An embodiment overcomes all or part of the disadvantages of known light sensors, for example, known light sensors comprising a SPAD pixel array.

An embodiment provides a light sensor comprising an integrated circuit chip and a boost DC/DC converter, wherein: the integrated circuit chip comprises a pixel array, each pixel comprising at least one single-photon avalanche diode; the converter is configured to deliver a bias potential to the diodes of the pixels, the bias potential being capable of placing said diodes in Geiger mode; and the converter comprises: an inductive element coupling a node configured to receive a first power supply potential to an intermediate node; a first switch coupling the intermediate node to a reference potential; a second switch coupling the intermediate node to an output node of the converter, the output node being configured to deliver said bias potential; and a control circuit configured to control switching of the first switch, the inductive element, the first switch, and the second switch of the converter being arranged outside of the integrated circuit chip and the control circuit forming part of said integrated circuit chip.

According to an embodiment, the second switch is a diode.

According to an embodiment, the converter further comprises a first capacitive element coupling the output node to the reference potential, the first capacitive element being arranged outside of the integrated circuit chip.

According to an embodiment, the output node of the converter is connected to an input node of the integrated circuit chip.

According to an embodiment, the input terminal of the integrated circuit chip is coupled, preferably connected, to an input of the control circuit.

According to an embodiment, the input terminal of the chip is coupled to the pixel array so that a potential on the input terminal is supplied to each single-photon avalanche diode of the pixel array of the integrated circuit chip.

According to an embodiment, the bias potential has a target value greater than 15 V, preferably greater than or equal to 20 V.

According to an embodiment, the sensor is configured to implement a time-of-flight capture function.

According to an embodiment, a control terminal of the first switch of the converter is connected to an output terminal of the integrated circuit chip.

According to an embodiment, an output of the control circuit is coupled, preferably connected, to the output terminal of the integrated circuit chip.

According to an embodiment, the converter further comprises a second capacitive element coupling the node configured to receive the first power supply potential to the reference potential, the second capacitive element being arranged outside of the integrated circuit chip.

According to an embodiment, the integrated circuit chip comprises a terminal configured to receive the reference potential.

According to an embodiment, the converter further comprises a resistor series-connected with the inductive element, between the node configured to receive the first power supply potential and the intermediate node, the resistor being arranged outside of the integrated circuit chip and the chip comprising two terminals, each connected to a different end of the resistor and to the control circuit.

According to an embodiment, the sensor comprises a substrate having the integrated circuit chip and components of the converter which are arranged outside of the integrated circuit chip assembled thereon, the support comprising conductive tracks configured to connect together the chip and the components of the converter which are arranged outside of the integrated circuit chip. The converter components which are arranged outside of the chip and which are assembled on the support comprise, for example, the first and second switches and the inductive element.

According to an embodiment, the sensor further comprises: a protection package assembled on the support; and at least one light source assembled on the support, the chip, the inductive element of the converter, the first and second switches of the converter, and said at least one light source being encapsulated in said package, and the sensor forming a plug-and-play module.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various known SPAD pixels have not all been described, the present description applying to all these known SPAD pixels. Similarly, the usual methods of controlling the cut-off switch(es) of a switched-mode power supply boost converter ("SMPS Boost Converter") and the usual control circuits implementing these usual control methods have not all been detailed, the present description applying to these usual control methods and to these usual control circuits.

In the following description, unless otherwise indicated, each potential is for example referenced to a same reference potential, for example, ground GND, and the potential of a same node then has the same value as the voltage taken between this node and a reference potential node.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
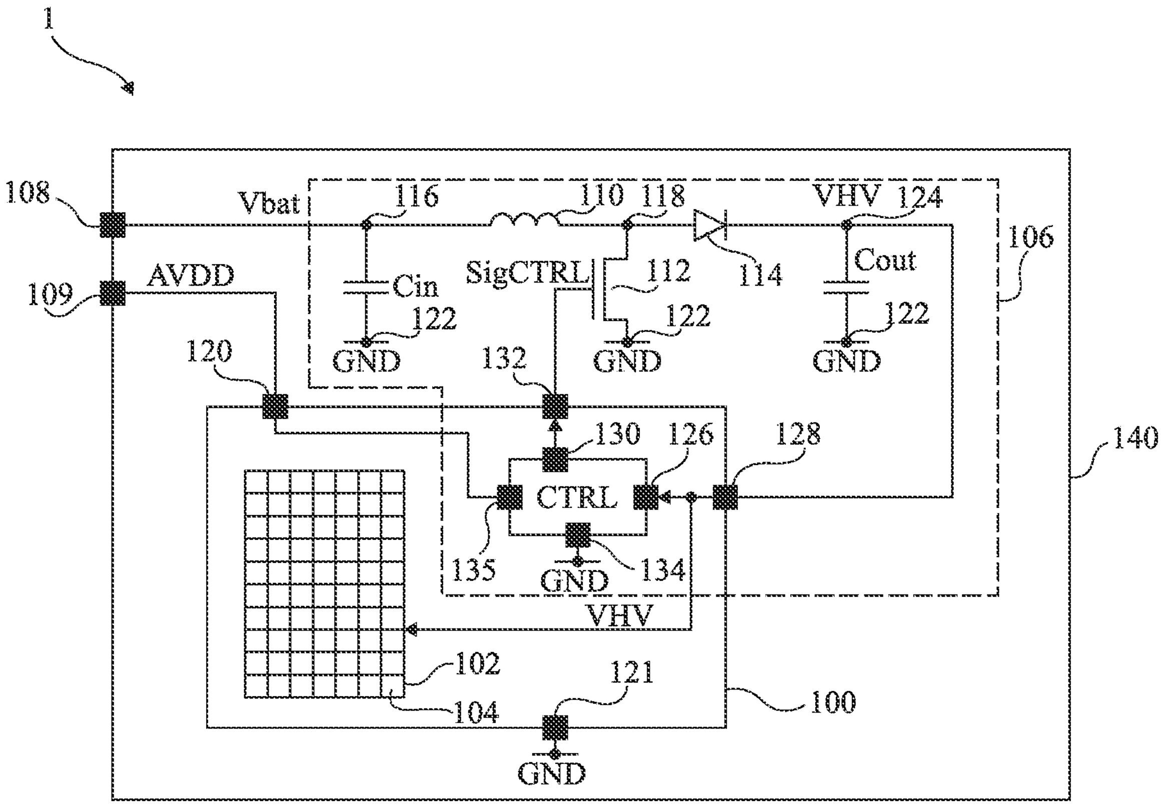
FIG. 1 schematically shows, at least partly in the form of blocks, an embodiment of a light sensor.

FIG. 1 schematically shows, partly in the form of blocks, an embodiment of a light sensor 1.

Light sensor 1 is, for example, a time-of-flight sensor capable of generating a depth map of a scene captured by sensor 1.

Light sensor 1 comprises an integrated circuit chip 100. Chip 100, for example, comprises a portion of a semiconductor layer, for example, made of silicon, having all the electronic components of chip 100 formed inside and on top of it.

In particular, integrated circuit chip 100 comprises an array 102 of pixels 104. In FIG. 1, as an example, array 102 comprises seven columns and ten rows of pixels 104, that is, seventy pixels 104, a single pixel 104 being referenced in FIG. 1 to avoid overloading the illustration. Array 102 may, however, comprise a different number of columns and/or of rows of pixel 104, and thus a different number, for example, smaller or greater, of pixels 104.

Each pixel 104 comprises a single-photon avalanche diode (not illustrated in FIG. 1). In other words, each pixel 102 comprises a diode configured to receive a bias potential VHV above its breakdown voltage, to be able to be placed in Geiger mode. For example, in each pixel, the single-photon avalanche diode has its cathode coupled to potential VHV and its anode coupled to a reference potential, for example, ground GND. As an example, potential VHV, referenced to reference potential GND, has a value greater than 15 V, preferably greater than or equal to 20 V, for example, a value substantially equal to 25 V. As an example, each pixel 102 comprises a single single-photon avalanche diode. As an alternative example, a pixel may comprise a plurality of single-photon avalanche diodes, each of which may be associated with its own quenching circuit and the assembly being, for example, referred to as a macropixel.

Figure 2:
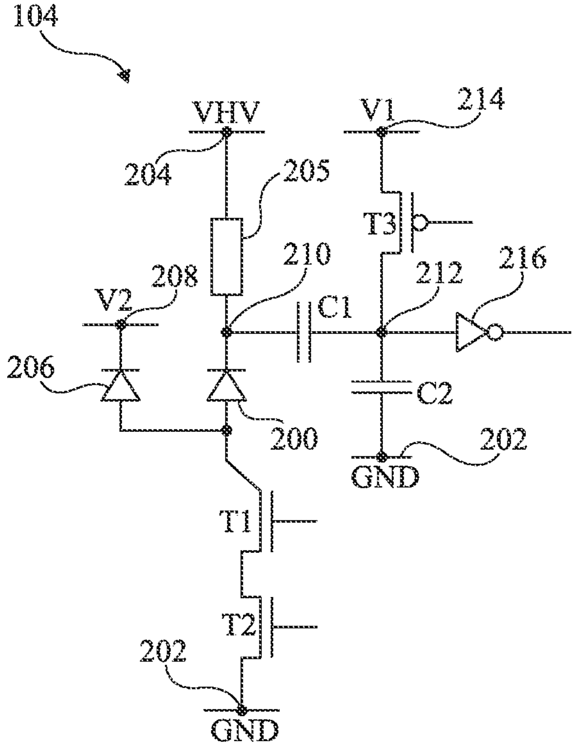
FIG. 2 schematically shows an example of a pixel comprising a single-photon avalanche diode.

An example of a pixel 104 capable of being implemented in array 102 is illustrated in FIG. 2. This example of pixel 104 is similar to the pixel shown in FIGS. 1, 5, 6, 7 and 8 of U.S. Pat. No. 11,336,853 (corresponding to EP 3806162 and CN 112702546), incorporated herein by reference. The example of pixel 104 of FIG. 2 is, more particularly, similar to the pixel of FIG. 5 of U.S. Pat. No. 11,336,853.

In this example, pixel 104 comprises a single-photon avalanche diode 200. The anode of diode 200 is coupled to potential GND, that is, to a node 202 configured to receive potential GND. The cathode of diode 200 is coupled to potential VHV, that is, to a node 206 configured to receive potential VHV.

More particularly, in this example, the cathode of diode 200 is coupled to node 204 by a resistor 205. Resistor 205, referred to as a quenching resistor, is configured to quench, that is, stop, an avalanche phenomenon in diode 200. In this example, the anode of diode 200 is coupled to node 202 by two MOS ("Metal Oxide Semiconductor") transistors T1 and T2. Transistor T1 is, for example, configured to quench an avalanche phenomenon in diode 200 when it is switched to the off state. Transistor T2 is, for example, configured to deactivate pixel 104 when it is switched to the off state.

In this example, pixel 104 further comprises a pull-up diode 206 having its anode connected to the anode of diode 200 and having its cathode connected to a node 208 configured to receive a potential V2. Potential V2 is smaller than potential VHV. For example, potential V2 is in the order of 7 V.

In this example, pixel 104 further comprises two capacitive elements C1 and C2. Capacitive element C1 is connected between node 210 of connection of diode 200 to resistor 205, and a node 212. Capacitive element C2 is connected between node 212 and node 202. Capacitive elements C1 and C2 form a capacitive dividing bridge configured to repeat or transmit variations of the cathode of diode 200 on node 212.

In this example, pixel 104 further comprises a circuit 216, here an inverter, configured to switch its output as a result of a variation of the potential on node 212 resulting from an avalanche phenomenon in diode 200. In other words, circuit 216 is configured to detect an avalanche phenomenon in diode 200.

In this example, pixel 104 further comprises an optional MOS transistor T3. Transistor T3 couples node 212 to a node 214 configured to receive a potential V1. Potential V1 is smaller than potential VHV. Potential V1 is, for example, a power supply potential in the order of 1.2 V. A potential received by the gate of transistor T3 enables to modify the duration of the pulses provided at the output of circuit 216.

It will be within the abilities of those skilled in the art to provide pixels 104 of the single-photon avalanche diode different from that of FIG. 2, where, as in FIG. 2, the single-photon avalanche diode receives potential VHV, for example, on its cathode, to be able to be placed in Geiger mode. In other words, it will be within the abilities of those skilled in the art to provide single-photon avalanche diode pixels 104 different from that of FIG. 2 but which require each receiving potential VHV to operate.

Referring again to FIG. 1, sensor 1 further comprises a switched-mode boost converter 106 (delimited by dotted lines in FIG. 1).

Converter 106 is configured to deliver potential VHV to the single-photon avalanche diodes of array 102 of pixels 104. More particularly, converter 106 is configured to deliver potential VHV from a power supply potential Vbat. Potentials Vbat and VHV are DC ("Direct Current") potentials. In other words, converter 106 is a DC/DC converter.

As an example, potential Vbat is smaller, for example, by at least 10 V, than potential VHV. As an example, potential Vbat is smaller than or equal to 5 V, for example, substantially equal to 3.6 V.

Converter 106 comprises an inductive element 110, a switch 112, a diode 114, and a control circuit CTRL configured to control switching of switch 112.

Inductive element 110 couples a node 116 configured to receive potential Vbat to an intermediate node 118. In other words, a terminal of inductive element 110 is coupled, for example, connected, to node 116, the other terminal of inductive element 110 being coupled, for example, connected, to node 118.

Switch 112 couples node 118 to reference potential GND, that is, switch 112 couples node 118 to a node 122 configured to receive reference potential GND. This switch 112 is, for example, called low side switch. For example, switch 112 comprises a conduction terminal coupled, for example, connected, to node 118, and another conduction terminal coupled, for example, connected, to node 122. Switch 112 receives a control signal sigCTRL on a control terminal.

As an example, switch 112 is implemented by an N-channel MOS transistor. For example, a first conduction terminal, for example, the drain, of transistor 112, is coupled, preferably connected, to node 118, a second conduction terminal of transistor 112, for example, the source, is coupled, preferably connected, to node 122, and the gate of transistor 112 receives signal sigCTRL. Preferably, when signal sigCTRL is switched to a high potential equal to a power supply potential of chip 100, this is sufficient to switch transistor 112 to the on state. Thus, switch 112 is controlled by a signal, here a voltage, having a maximum value smaller than or equal to the value of the power supply voltage of chip 100.

Diode 114 couples intermediate node 118 to an output node 124 of converter 106. Node 124 is configured to supply the potential VHV. In other words, converter 106 supplies potential VHV on its output node 124. Diode 114 has a first electrode, here its anode, coupled, preferably connected, to node 118, and a second electrode, here its cathode, coupled, preferably connected, to node 124. In practice, diode 114 implements a switch function. In other words, diode 114 is a switch (non-controllable), called high side switch. As an example, diode 114 is a Schottky diode.

Circuit CTRL is configured to control switch 112, that is, control the switching on/off of switch 112, to maintain potential VHV at a target value Vtarget. Target value Vtarget is, for example, greater than 15 V, preferably greater than or equal to 20 V, for example, substantially equal to 25 V.

For this purpose, circuit CTRL is configured to receive a signal representative of potential VHV, for example, the actual potential VHV. Further, circuit CTRL is configured to supply the control signal sigCTRL of switch 112. As an example, circuit CTRL is configured to control switch 112 in pulse-width modulation (PWM).

Circuit CTRL forms part of chip 100, conversely to inductive element 110, to switch 112, and to diode 114, which are arranged outside of chip 100, that is, they do not form part of chip 100. In particular, node 118 is outside of chip 100.

Thus, circuit CTRL comprises a terminal, or node or input, 126 configured to receive the signal representative of potential VHV and, more particularly, potential VHV in the example of FIG. 1. The terminal 126 of circuit CTRL is coupled, preferably connected, to an input terminal 128 of chip 100. Terminal 128 is configured to receive potential VHV.

Although this is not detailed in FIG. 1, preferably, terminal 126 of circuit CTRL, for example, corresponds to an end of a voltage dividing bridge, for example a resistive voltage dividing bridge, configured to divide the value of potential VHV to obtain a potential representative of potential VHV but having a value compatible with the maximum voltages withstood by the transistors of chip 100. As an example, this potential representative of potential VHV has a maximum value smaller than that of the power supply potential AVDD of chip 100. The voltage dividing bridge, for example, forms part of circuit CTRL, and thus of chip 100.

More generally, instead of the voltage dividing bridge, circuit CTRL may comprise any usual circuit configured for supplying a potential which is representative of potential VHV and which has a maximum value smaller than that of the maximum value withstood by the MOS transistors of chip 100.

Terminal 128 is further coupled, preferably connected, to the array 102 of pixels 104 of chip 100, so that the potential VHV on terminal 128 is supplied to array 102, more particularly to each pixel 104 of array 102, and more particularly still to each single-photon avalanche diode of array 102. Thus, each single-photon avalanche diode of array 102 receives potential VHV, for example, on its cathode as in the example of FIG. 2. As an example, for a potential VHV, that is, a target value Vtarget, in the order of 25 V, the current drawn by array 102 on node 124 is in the order of 30 mA in steady-state operation, and may reach, for example, at least 45 mA during transient current inrushes.

Further, circuit CTRL comprises a terminal, or node or output, 130 configured to supply control signal sigCTRL. Terminal 130 is coupled, preferably connected, to an output terminal 132 of chip 100. Output terminal 132 is configured to supply signal sigCTRL to the switch 112 arranged outside of chip 100. Terminal 132 is connected to the control terminal of switch 112.

As an example, chip 100 is powered with a potential AVDD, chip 100 then comprising a terminal 120 configured to receive potential AVDD, and a terminal 121 configured to receive reference potential GND. As an example, the power supply potential AVDD of chip 100 has a value substantially equal to 3.6 V.

As an example, circuit CTRL is also powered with potential AVDD and then comprises a terminal or node 134 configured to receive reference potential GND and a terminal 135 configured to receive potential AVDD. As an example, terminal 134 is coupled, preferably connected, to the input terminal 121 of chip 100. As an example, terminal 135 is coupled, preferably connected, to the input terminal 120 of the chip.

Usually for switched-mode boost converters, converter 1 comprises a capacitive element Cout coupling nodes 124 and 122 together. For example, capacitive element Cout comprises a first electrode coupled, preferably connected, to node 124 and a second electrode coupled, preferably connected, to node 122.

As an example, converter 1 further comprises a capacitive element Cin coupling node 116 to node 122. For example, capacitive element Cin comprises a first electrode coupled, preferably connected, to node 124 and a second electrode coupled, preferably connected, to node 122. This capacitive element Cin may be omitted, for example, when the impedance between a voltage source supplying potential Vbat and node 116 is sufficiently low for the voltage drops on node 116 during current draws on node 116 by converter 106 to be negligible.

According to an embodiment, at least the inductive element 110, the switch 112, and the diode 114 of converter 306 are arranged outside of chip 100, and at least the control circuit CTRL of converter 106 forms part of chip 100.

Although this is not illustrated, chip 100 comprises many MOS transistors, for example in control circuits and readout circuits of the pixels 104 of array 102. These transistors are not meant to implement power applications, and are thus not capable of withstanding high voltages, for example, the voltage applied across each single-photon avalanche diode of array 102 to place this diode in Geiger mode. For example, most of the MOS transistors of chip 100 are configured to withstand voltages smaller than Vbat. As an example, a few transistors of chip 100 are configured to withstand maximum voltages greater than Vbat and the other transistors are standard low-voltage transistors, for example configured to withstand between their terminals voltages smaller than or equal to voltage AVDD.

According to an embodiment, chip 100 and the components of converter 106 which are external to chip 100, that is, inductive element 110, switch 112, diode 114 and, when they are present, capacitive elements Cin and Cout, are assembled on a support or substrate 140. Support 140 forms part of sensor 1. According to an alternative embodiment, capacitive elements Cin and/or Cout may be arranged outside of sensor 1.

As an example, sensor 1, and more particularly its support 140, comprise an input terminal 108 configured to receive potential Vbat. As an example, potential Vbat is supplied to sensor 1 by a circuit external to sensor 1.

As an example, sensor 1, and more particularly its support 140, comprise an input terminal 109 configured to receive potential AVDD. As an example, potential AVDD is supplied to sensor 1 by a circuit external to sensor 1.

As an alternative example, potentials AVDD and Vbat are the same, terminal 108 then being, for example, directly connected with terminal 109.

As another alternative example, sensor 1 only receives from the outside one of potentials AVDD and Vbat, for example, potential Vbat, and comprises a circuit configured to supply the other of potentials AVDD and Vbat, for example, potential AVDD, based on the potential received by sensor 1.

Although this is not detailed in FIG. 1, support 140 comprises conductive tracks, to implement the previously-described couplings or connections between chip 100, and more particularly the input and output terminals of chip 100, and the components of converter 106 which are arranged outside of chip 100.

Although this is not illustrated in FIG. 1, when sensor 1 is a time-of-flight sensor, sensor 1 may further comprise one or a plurality of light sources, for example, one or a plurality of vertical cavity surface-emitting laser (VCSEL) diodes, and the circuits for driving ("drivers") these light sources. The light source(s) and the driver circuit(s) are configured to emit a light signal towards a scene, array 102 being configured to receive the corresponding signal reflected by the scene. The light source(s) and the driver circuit(s) are preferably discrete components assembled on support 140. Other discrete components of sensor 1 may also be assembled on support 140. Further, sensor 1 comprises, for example, a protection package mounted on, or assembled with, support 140. The package comprises an opening opposite array 102 of pixels 104 and an opening opposite the light source(s). All the components of the chip(s) of sensor 1 which are assembled on support 140 are then encapsulated in this package. In other words, sensor 1 then forms a plug-and-play module which just needs to be powered, for example by the supplying of potentials Vbat and AVDD to the terminals 108 and 109 of support 140, so that sensor 1 can operate. As an example, support 140 is then configured to be assembled to a motherboard of a complex electronic system, such as for example a smart phone, for example, on a printed circuit board (PCB) or a flexible printed circuit board ("Flex PCB").

The components of converter 106 which are arranged outside of chip 100 are usual components, easily available.

Rather than integrating circuit CTRL in the chip 100 of sensor 1, that is, in the chip 100 comprising the pixels 104 of sensor 1, it could have been devised to use a switched-mode boost converter fully arranged outside of the chip, in the form of a discrete component which would have been assembled on support 140. However, this would have increased the size of support 140, and thus the bulk of sensor 1, for example, when sensor 1 is a plug-and-play module.

It could also have been devised to directly supply potential VHV to sensor 1 by arranging converter 106 fully outside of sensor 1, that is, converter 106 would not have been assembled on the same support 140 as chip 100. However, this would have increased the distance between the converter supplying potential VHV and sensor 1, which would have resulted in increasing losses, and/or in increasing the response times of the converter, and/or in decreasing the fineness of control of the value of potential VHV.

Further, rather than providing for the converter 106 of sensor 1 to be arranged partly in chip 100 and partly outside of chip 100, it could have been devised to use a charge pump fully integrated in chip 100. However, the efficiency of such a charge pump would have been much lower than that of converter 106 and, further, the surface area occupied by the charge pump would have been much greater than that occupied by circuit CTRL. For example, considering a charge pump having an efficiency in the order of 25%, to supply at the output of the charge pump a maximum current in the order of 45 mA for a potential VHV substantially equal to 25 V, that is, to supply approximately 1 W at the output of the charge pump, it would have been necessary for the power source supplying potential Vbat to be capable of delivering more than 4 W of supply power, which is too high a power consumption with respect to the power consumption that a switched-mode DC/DC converter would have to supply the same output power. As an example, the high power consumption linked to the use of a charge pump adversely affects the autonomy of a mobile object powered by a battery.

It could have been devised to integrate switch 112 in chip 100. However, switch 112 sees, between its terminals, voltages ranging up to the value of potential VHV, and chip 100, particularly its MOS transistors which could have been envisaged to implement switch 112, are not provided to withstand such voltages.

Further, the provision of circuit CTRL as being integral with chip 100 allows a much finer control of the value of potential VHV, that is, the target value Vtarget, necessary to the proper operation of the single-photon avalanche diodes of array 102, with respect to the case where this circuit CTRL would have been arranged outside of chip 100. For example, circuit CTRL may be configured to modify value Vtarget according to the operating conditions of chip 100, for example, according to the temperature of chip 100, and thus of the single-photon avalanche diodes.

More generally, the implementation of the converter 106 of sensor 1 such as described in relation with FIG. 1 allows a better conversion efficiency, a better efficiency of regulation of potential VHV with a smaller bulk than if converter 106 was replaced with a charge pump integrated to chip 100 or with a switched-mode boost converter totally external to the chip.

In an alternative embodiment, not illustrated, the high side switch of converter 106 is implemented by a controllable switch rather than by diode 114, which corresponds to a non-controllable switch. The controllable switch replacing diode 14 is then controlled by circuit CTRL. This high side controllable switch is, for example, a P-channel MOS transistor. In this case, the control signal, typically a control voltage, of the high side PMOS transistor has a value much greater than what the circuits of chip 100 are capable of delivering and/or of withstanding. The high side transistor is then provided with a level shifter circuit enabling to supply a control voltage adapted to the high side transistor based on a control signal supplied by circuit CTRL. This level shifter circuit and the high side transistor are then in the form of one or a plurality of discrete components assembled on support 140.

The implementation of the high side switch of converter 106 with diode 114 rather than with a MOS transistor is advantageous in that it is less complex and less bulky.

Figure 3:
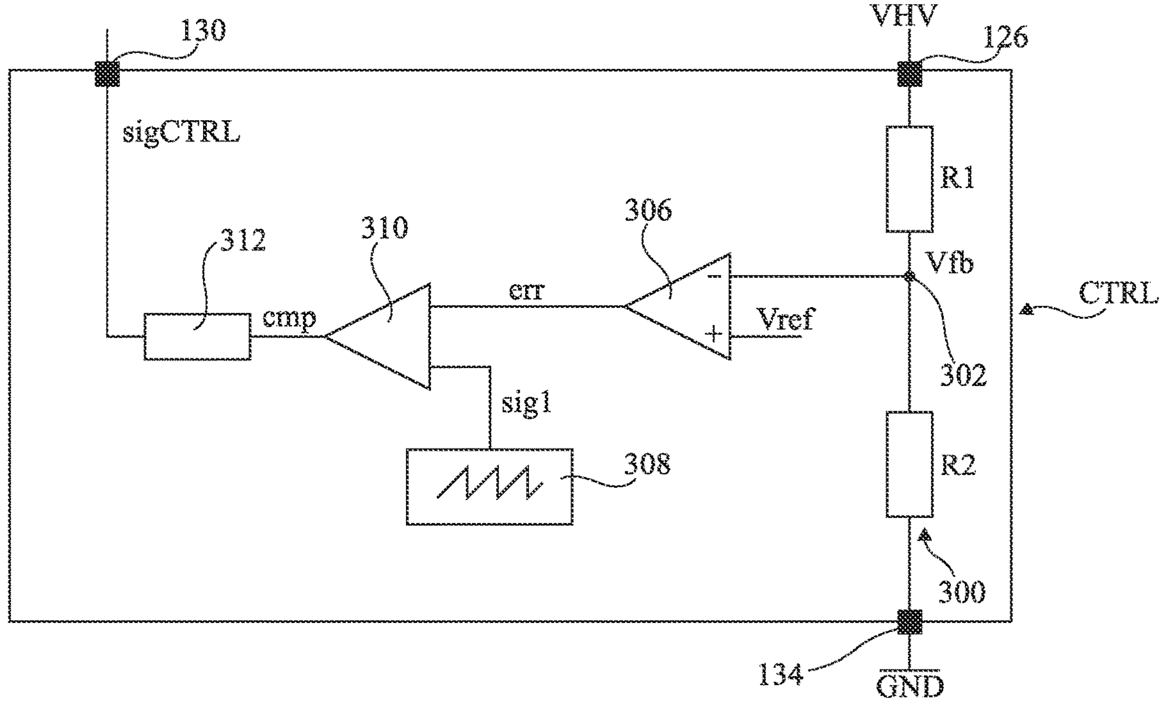
FIG. 3 schematically shows, at least partially in the form of blocks, an example of a circuit of the sensor of FIG. 1.

FIG. 3 schematically shows, partly in the form of blocks, a more detailed example of the circuit CTRL of the sensor of FIG. 1. In this example, circuit CTRL implements a PWM control of the on/off state of switch 112. The terminal 135 of circuit CTRL is not shown in FIG. 3.

In the example of FIG. 3, circuit CTRL comprises a resistive voltage dividing bridge 300, connected between the inputs, or terminals, 126 and 134 of circuit CTRL. Voltage dividing bridge 300 is configured to divide the value of potential VHV and supply this divided value Vfb on a node 302. In other words, dividing bridge 300 receives potential VHV and supplies potential Vfb from potential VHV, potential Vfb being representative of potential VHV and being smaller than potential VHV. Preferably, voltage Vfb is smaller than the maximum voltage that the components, particularly the transistors, of chip 100 can withstand. For example, voltage Vfb is smaller than voltage Vbat, preferably smaller than voltage AVDD.

As an example, voltage dividing bridge 300 comprises a resistor R1 connected between nodes 126 and 302, and a resistor R2 connected between nodes 302 and 134.

Circuit CTRL further comprises a circuit 306. Circuit 306 is configured to supply a signal err representative of the value difference, that is, of the error, between voltage Vfb and a voltage Vref. Voltage value Vref is determined by value Vtarget. Thus, signal err is representative of the value difference, or error between potential VHV and its target value. Circuit 306 is configured to receive signal Vfb, signal Vref, and to supply signal err. As an example, circuit 306 implements a proportional integral derivative (PID) filtering function. As an example, circuit 306 comprises an operational amplifier assembled as an error amplifier, the usual passive components of this error amplifier not being shown in FIG. 3 to avoid overloading the drawing. As an example, signal Vref is received by an input of circuit 306, for example, the non-inverting input (+) of the operational amplifier, signal Vfb is received by another input of circuit 306, for example, the inverting input (−) of the operational amplifier, and signal err is available at the output of circuit 206, for example, at the output of the operational amplifier.

Circuit CTRL further comprises a circuit 308. Circuit 308 is configured to supply a periodic sawtooth signal sig1. The frequency of signal sig1 corresponds, in this example, to the switching frequency of switch 112 (see FIG. 1) and is, for example, in the order of 10 MHz.

Circuit CTRL further comprises a circuit 310 configured to compare signal sig1 with signal err, and to supply a binary signal cmp having its binary state indicating the result of this comparison. For example, signal cmp is in a first binary state when signal err is smaller than signal sig1, and in a second binary state when signal err is greater than signal sig1. Thus, the width of each pulse of signal cmp is modulated according to the value of potential VHV.

Circuit CTRL may comprise, as illustrated in FIG. 3, a circuit 312 configured to supply signal sigCTRL based on signal cmp. Circuit 312 is configured to shape signal cmp to generate signal sigCTRL. As an example, circuit 312 is a buffer circuit. As an example, each switching of signal cmp causes a corresponding switching of signal sigCTRL, and each switching of signal sigCTRL is caused by a corresponding switching of signal cmp.

According to another example, not illustrated, circuit 312 may be omitted.

Although there has been described hereabove, particularly in relation with FIG. 3, a case where circuit CTRL is configured to control switch 112 (FIG. 1) in PWM, the present description is not limited to this example of control. Indeed, as an alternative example, circuit CTRL may implement a pulse frequency modulation (PFM) control or a hysteresis-type control. In still another example, circuit CTRL may be configured to switch between at least two control modes of switch 112, for example, between a PWM control and a PFM control, the switching between these different control modes being, for example, determined by the power drawn by chip 100 on node 124 (see FIG. 1).

As an example, in embodiments, circuit CTRL may need to know the current in the inductive element, for example, to know whether the current is equal to zero or not, to generate signal sigCTRL.

In this case, converter 106 may comprise a circuit configured to determine the current in inductive element 110, for example, a circuit configured to detect when the current in inductive element 110 becomes zero.

Figure 4:
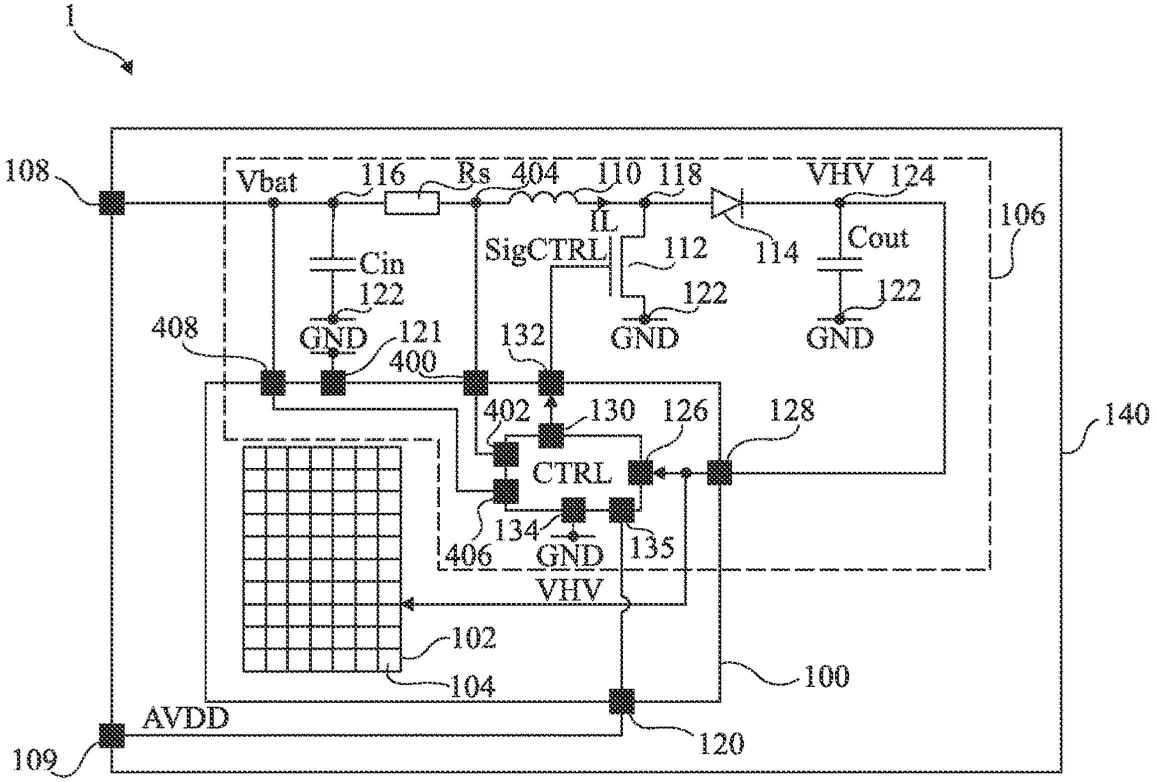
FIG. 4 schematically shows, at least partly in the form of blocks, an alternative embodiment of the sensor of FIG. 1.

FIG. 4 schematically shows, at least partly in the form of blocks, an alternative embodiment of the sensor 1 of FIG. 1. Only the differences between the converter 1 of FIG. 1 and that of FIG. 4 are here highlighted.

In this variant, circuit CTRL is configured to generate signal sigCTRL not only based on the value of potential VHV, that is, based on the value difference between the potential VHV effectively available on node 124 and the targeted value Vtarget of potential VHV, but, further, based on the value of current IL in inductive element 110, for example, based on a detection that the current IL in the inductive element becomes zero.

Thus, as compared with the converter 106 of FIG. 1, the converter 106 of FIG. 4 comprises a resistor Rs, for example, referred to as a shunt resistor.

This resistor Rs is series-connected with inductive element 110, between nodes 118 and 116.

For example, in FIG. 4, resistor Rs has an end, or terminal, connected, to node 116, another end, or terminal, connected to an electrode of inductive element 110, the other electrode of inductive element 110 being connected to node 118. As an alternative example, not illustrated, resistor Rs has an end, or terminal, connected to node 118, another end, or terminal, connected to an electrode of inductive element 110, the other electrode of inductive element 110 being connected to node 116.

Preferably, resistor Rs is connected on the side of node 116, so that the voltage on each terminal of resistor Rs remains smaller than or equal to a maximum voltage value that the transistors of chip 100 can withstand.

Resistor Rs is, like elements 110, 112, and 114, and, when they are present, capacitive elements Cin and Cout, arranged outside of chip 100.

Circuit CTRL comprises two terminals, or nodes or inputs, 402 and 406, each configured to receive the voltage on one of the terminals of resistor Rs. Thus, chip 100 comprises two terminals, or inputs, 400 and 408, each connected to a different end or terminal of resistor Rs, and to the control circuit.

In the example of FIG. 4, the terminal 408 of chip 100 is connected to a first end of resistor Rs, that is, in this example, node 116, and the terminal 400 of chip 100 is connected to a second end of resistor Rs, that is, in this example, a node 404 of connection between inductive element 110 and resistor Rs. Further, the terminal 408 of chip 100 is connected to the terminal 406 of circuit CTRL and the terminal 400 of chip 100 is connected to the terminal 402 of circuit CTRL.

It will be within the abilities of those skilled in the art to adapt the description made hereabove in relation with FIG. 4 to the case where potentials AVDD and Vbat are the same and/or to the case where resistor Rs has a terminal connected to node 118.

Various embodiments and variants have been described. Those skilled in the art will understand that certain features of these various embodiments and variants may be combined, and other variants will occur to those skilled in the art. In particular, it will be within the abilities of those skilled in the art to provide other embodiments of a switched-mode boost converter having its low side switch, its high side switch, preferably a diode, and its inductive element arranged outside of an integrated circuit chip comprising an array of pixels, each comprising a single-photon avalanche diode, and having a control circuit of the low side switch, or in other words, the voltage and/or current feedback loop of the converter, integral with this chip. In this case, according to an embodiment, the high side and low side switches of the converter, that is, the chopping switch of the converter, the inductive element, and the measurement resistor when present, are assembled on the same support as the chip, for example, when the sensor forms a plug-and-play module.

Finally, the practical implementation of the described embodiments and variations is within the abilities of those skilled in the art based on the functional indications given hereabove.

The invention claimed is:

1. A light sensor, comprising:

an integrated circuit chip comprising a pixel array including a plurality of pixels, each pixel of said plurality of pixels comprising a single-photon avalanche diode; and a boost DC/DC converter configured to deliver a bias potential to the single-photon avalanche diode of each pixel, wherein the bias potential is configured to place each single-photon avalanche diode in Geiger mode;

wherein the boost DC/DC converter comprises:

an inductive element coupling a node configured to receive a first power supply potential to an intermediate node;

a first switch coupling the intermediate node to a reference potential;

a second switch coupling the intermediate node to an output node configured to deliver said bias potential; and a control circuit configured to control switching of the first switch;

wherein the inductive element, the first switch, and the second switch of the boost DC/DC converter are arranged outside of the integrated circuit chip; and wherein the control circuit forms a part of said integrated circuit chip.

2. The light sensor according to claim 1, wherein the second switch is a diode.

3. The light sensor according to claim 1, wherein the boost DC/DC converter further comprises a first capacitive element coupling the output node to the reference potential, the first capacitive element being arranged outside of the integrated circuit chip.

4. The light sensor according to claim 1, wherein the output node is connected to an input terminal of the integrated circuit chip.

5. The light sensor according to claim 4, wherein the input terminal of the integrated circuit chip is coupled to an input of the control circuit.

6. The light sensor according to claim 4, wherein the input terminal of the integrated circuit chip is coupled to the pixel array so that a potential on the input terminal is supplied to each single-photon avalanche diode of the pixel array of the integrated circuit chip.

7. The light sensor according to claim 1, wherein the bias potential has a target value greater than 15 V.

8. The light sensor according to claim 1, wherein the bias potential has a target value greater than or equal to 20 V.

9. The light sensor according to claim 1, configured to implement a time-of-flight capture function.

10. The light sensor according to claim 1, wherein a control terminal of the first switch of the boost DC/DC converter is connected to an output terminal of the integrated circuit chip.

11. The light sensor according to claim 10, wherein an output of the control circuit is coupled to the output terminal of the integrated circuit chip.

12. The light sensor according to claim 1, wherein the boost DC/DC converter further comprises a second capacitive element coupling the node configured to receive the first power supply potential to the reference potential, the second capacitive element being arranged outside of the integrated circuit chip.

13. The light sensor according to claim 1, wherein the integrated circuit chip comprises a terminal configured to receive the reference potential.

14. The light sensor according to claim 1, wherein the boost DC/DC converter further comprises a resistor series-connected with the inductive element between the node configured to receive the first power supply potential and the intermediate node, the resistor being arranged outside of the integrated circuit chip, and wherein the integrated circuit chip includes two terminals connected to different ends of the resistor and to the control circuit.

15. The light sensor according to claim 1, further comprising a substrate support having the integrated circuit chip and components of the boost DC/DC converter which are arranged outside of the integrated circuit chip assembled thereon, the substrate support comprising conductive tracks configured to electrically connect the integrated circuit chip and the components of the boost DC/DC converter which are arranged outside of the integrated circuit chip.

16. The light sensor according to claim 15, further comprising:

a protection package assembled on the substrate support; and at least one light source assembled on the substrate support;

wherein the integrated circuit chip, the inductive element of the boost DC/DC converter, the first and second switches of the boost DC/DC converter, and said at least one light source being encapsulated in said protection package, and the light sensor forming a plug-and-play module.

* * * * *